2,809,930
REMOVAL OF SULFUR COMPOUNDS FROM FLUIDS

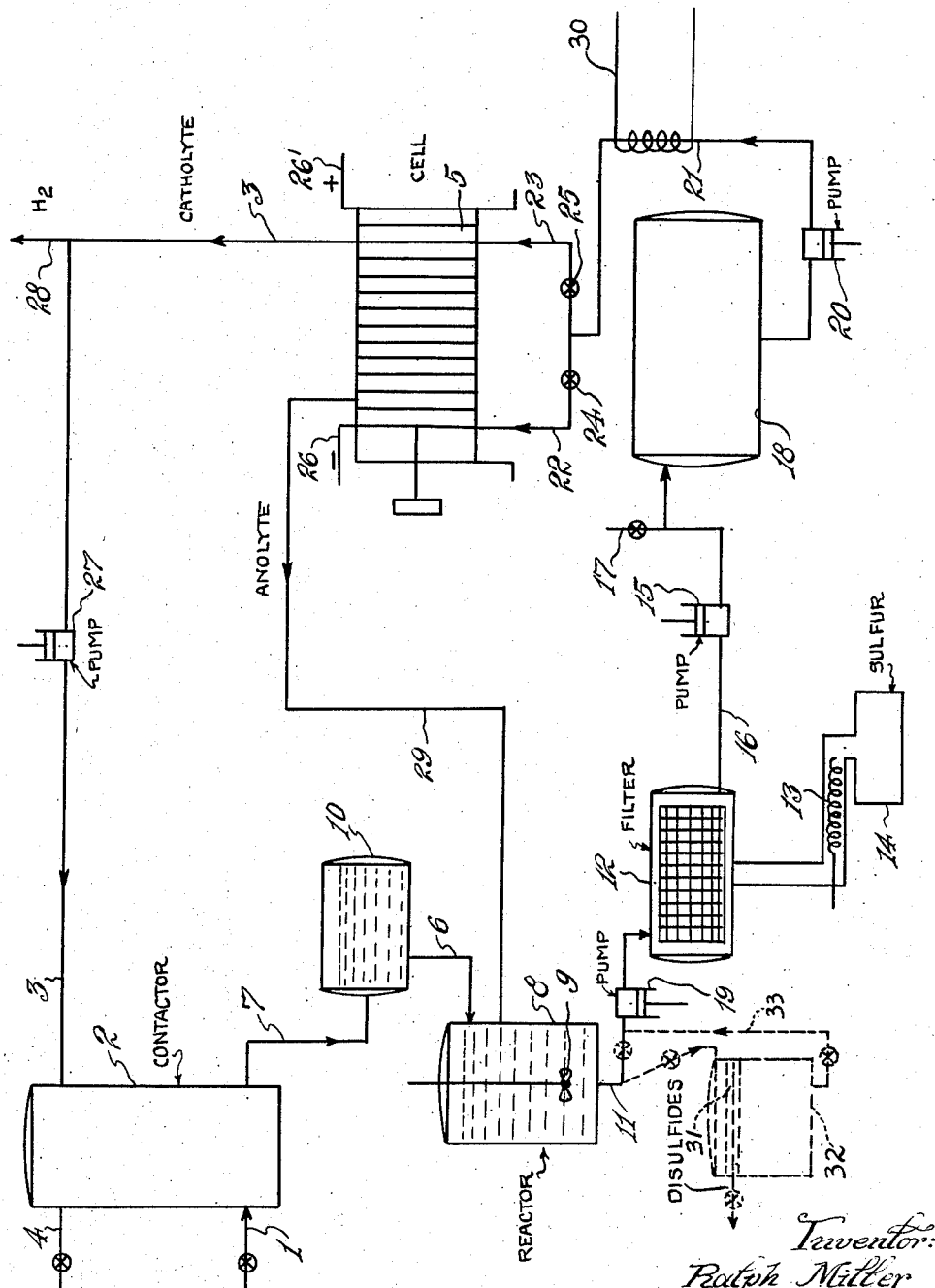

Ralph Miller, Pleasantville, N. Y., assignor to American Development Corp., a corporation of New Jersey Application November 18, 1954, Serial No. 469,631

3 Claims. (Cl. 204—136)

This invention relates to the removal of sulfur compounds, such as hydrogen sulfide, from fluids such as gases and liquids, by treatment with an electrolyzed brine containing bromine. More specifically, it concerns the treatment of hydrogen sulfide-containing fluids or similar substances, with an aqueous caustic solution of alkali metal bromide and chloride which had been electrolyzed previously to liberate free bromine.

Hydrogen sulfide is a well known pollutant and trouble-maker, particularly in the petroleum industry, and its removal generally is required. Unfortunately, such removal is not a simple matter and is accompanied usually by expense and concomitant production of waste effluent which becomes a serious disposal problem. In many instances, its presence in hydrocarbon streams, for example, is of such small concentration that it is uneconomical to install any of the presently known processes for its removal. Yet, it is an unwanted contaminant which should be removed for health, odor, corrosion and other reasons.

The most common method presently employed for removal of this toxic gas from hydrocarbon oils is by scrubbing with an alkaline solution, such as a 10–15% NaOH aqueous solution. The resultant sodium sulfide formed is a very stable compound having relatively few industrial uses and which is a bad waste effluent due to its high biological oxygen demand. Actually at the present time there is no known simple feasible process for effecting hydrogen sulfide removal or sodium sulfide disposal.

The present invention has been devised to remove hydrogen sulfide from fluid streams (gas or liquid), by treating said streams with a fairly inexpensive reagent, in which there is substantially no overall consumption of chemicals and which may be operated as a cyclic operation requiring only a moderate initial investment and which is readily controllable.

The invention may be more readily understood by reference to the accompanying drawing in which a preferred embodiment is depicted. In this drawing, which diagrammatically presents a flow sheet of the process, a hydrogen sulfide containing fluid stream is introduced via line 1 into scrubbing or contacting tower 2 countercurrent to a stream of liquid introduced into tower 2 through line 3. This liquid is an aqueous solution of caustic containing sodium chloride and sodium bromide, which removes the hydrogen sulfide from the fluid stream through formation of sodium sulfide. The H2S-free fluid stream leaves tower 2 through pipe 4.

The scrubbing reagent entering tower 2 from pipe 3 is the catholyte liquid pumped by pump 27 from electrolytic cell 5 which may be of the type generally identified as a diaphragm type chlorine-producing cell. The anolyte which preferably is the major volume of liquid flowing through cell 5, preferably is substantially caustic-free and contains free bromine as a result of the electrolysis, and this fluid stream leaves cell 5 through line 29 and is admixed with extract effluent leaving tower 2 through pipe 7, the latter containing sodium sulfide produced through removal of H2S in tower 2. These two streams from lines 6 and 7 are mixed in reactor tank 8, which may be provided with an agitator 9. The extract from line 7 leaving tower 2 may first be run into a surge tank 10, if desired, prior to being fed into reactor tank 8 through pipe 6.

In reactor tank 8 the sodium sulfide reacts with the free bromine to produce free sulfur and sodium bromide. The reaction mixture, thereafter, is pumped by pump 19 through line 11 into filter 12 which may be of the continuous rotary type, if desired, in which case the sulfur may be continuously removed by a scraper and run through a screw conveyor 13 into storage bin 14.

The filtrate from filter 12 may be pumped through line 16 by pump 15 and into cell feed tank 18. The liquid in this tank contains substantially sodium bromide, sodium chloride and water. By means of pump 20 it is pumped through line 21 and through lines 22 and 23, at a flow ratio dependent upon the amount of throttling of valves 24 and 25, respectively. Line 22 leads the fluid into the anolyte zone of cell 5, while line 23 leads the cell feed liquid into the catholyte portion of cell 5.

In cell 5 (having electric leads 26 and 26') the sodium chloride and bromide are electrolyzed, sodium hydroxide being formed at the cathode, together with liberation of hydrogen gas which is vented through line 28, while at the anode bromine is liberated. Since excess sodium bromide is maintained in the anolyte, any chlorine which might form reacts with the sodium bromide to liberate bromine, so that there is no free chlorine available. The anolyte is fed through line 29 into reactor 8, wherein the free bromine is reacted with the sodium sulfide in the extract entering through line 7, to liberate free sulfur.

The following is an example of a preferred manner for carrying out the present invention:

A cell feed liquid containing 129 lbs. of sodium bromide, 680 lbs. of sodium chloride, and 2,591 lbs. of water is electrolyzed in an electrolytic cell of the chlorine-producing type. Of the total of 3,400 lbs. 3,000 lbs. are passed through the anolyte zone and about 400 lbs. are passed through the catholyte zone at a rate such that the catholyte discharge product contains about 15 lbs. sodium bromide, 40 lbs. sodium hydroxide, 51 lbs. sodium chloride, and 287 lbs. water, and the anolyte contains about 11 lbs. of sodium bromide, 80 lbs. bromine, 629 lbs. sodium chloride and 2,286 lbs. of water. The catholyte is fed (or pumped) into a contacting tower counter currently to a sour gasoline stream containing about 16 lbs. of sulfur as hydrogen sulfide.

As the catholyte washes the gasoline in the contactor, the sodium hydroxide reacts with the hydrogen sulfide, producing sodium sulfide, and the extract leaving the bottom of the tower contains about 15 lbs. of sodium bromide, 39 lbs. sodium sulfide, 51 lbs. sodium chloride and 305 lbs. of water. The sweetened gasoline is drawn off the top of the tower. Thereafter, the anolyte discharged from the cell and containing about 11 lbs. sodium bromide, 80 lbs. bromine, 629 lbs. sodium chloride and 2,286 lbs. of water, is mixed with the extract, whereupon reaction takes place between the bromine and sodium sulfide, producing about 16 lbs. of solid sulfur which is filtered out of the solution which now contains about 129 lbs. of sodium bromide, 680 lbs. sodium chloride and about 2,591 lbs. of water. This liquid then is recycled again as the cell feed for further electrolysis. During the electrolysis, there is produced about one pound of hydrogen which is vented to the atmosphere. It is advantageous to add a small amount (say one pound) of iodine to the solution, since it facilitates better reaction in the process.

The cell for carrying out the electrolysis is similar in many ways to a conventional "chlorine cell" having individual anolyte and catholyte compartments separated by a permeable diaphragm, such as one made of asbestos cloth which is liquid-permeable and gas-impermeable, typical of the kind used in production of caustic and chlorine by electrolysis of salt. The cell has individual inlets and outlets for each compartment and the hydrostatic pressure on both sides of the diaphragm is kept balanced so that there is no tendency for the solution to pass through the diaphragm except by some diffusion which normally takes place. It is provided with flow control means enabling independent control of either electrolyte flow. The cell may be made of concrete or rubber-lined steel. The cathode preferably is of iron, while the anode is preferably made of graphite. When properly operated, the cell does not discharge any substantial amount of gas at the anode. The composition of the electrolyte, the rate at which the solution is circulated through the cell compartments, and the number of amperes passing through the cell are correlated so that the number of faradays supplied to the anode do not exceed the number of equivalents of bromide flowing through the anolyte compartment, as otherwise gaseous chlorine will be evolved.

Use of the present system is a definite advance over the conventional chlorine cell system which could produce only small amounts of chlorine solution due to the poor solubility of chlorine in hot brine. Bromine, on the other hand, has a much greater solubility.

Although the chemical reaction in reactor 8 will produce heat, it is desirable to further heat the electrolyte entering the cell, as by steam coil 30 so as to reduce the voltage required for electrolysis. Cells of a commercial size have a current density of about 75–90 amperes per square foot of electrode surface, with a voltage drop of about 4 volts. Cells passing 1,000 amperes are readily built for this service.

The amount of anolyte added to the extract in reactor 8 is controlled so that substantially no sulfur or sulfur compounds enter cell 5 which would convert them to useless thiosulfate.

Although a liquid has been disclosed herein as the sulfur compound-containing fluid extracted, it is possible to treat gases and vapors in a similar manner. The term "brine" will be employed herein to designate an aqueous mixture of sodium chloride and sodium bromide. Fresh make-up solution may be introduced into the system through line 17.

Although the present process is most advantageously employed for the removal of hydrogen sulfide, it may be adapted for removal of other sulfur compounds, such as mercaptans, for example, particularly when they are present with hydrogen sulfide during the removal operation. In such case, the bromine oxidation would result in formation in the reactor of disulfides which would be insoluble in the brine mixture. These disulfides could be settled out as a layer 31 in tank 32, and the sulfur-brine slurry returned through line 33 to pump 19 for transfer to filter 12.

I claim:

1. The method of removing from a fluid contaminating amounts of sulfur compounds oxidizable to readily removable sulfur-containing substances, comprising extracting said fluid with aqueous brine containing caustic alkali, whereby said alkali is reacted with said sulfur compound to obtain an extract, mixing said extract with a brine containing bromine in sufficient amount to react and convert substantially all of the sulfur compound into a readily removable sulfur-containing substance, removing said readily-removable substance from said reaction mixture, thereby leaving a cell feed liquid, electrolyzing a major proportion of said cell feed liquid as anolyte under conditions to produce substantial amounts of bromine in the brine, employing said bromine-containing brine to react with said extract as aforesaid, and electrolyzing a minor proportion of said cell feed liquid as catholyte, thereby producing a brine-containing caustic alkali for use in extracting said sulfur impurity-containing fluid as aforesaid.

2. The method according to claim 1 in which the anolyte cell feed liquid contains sodium bromide in stoichiometric excess of the coulombs to which the anolyte is subjected.

3. The method of removing hydrogen sulfide from a fluid containing it in contaminating amounts, comprising extracting said fluid with an aqueous brine catholyte from an electrolytic cell, said brine containing caustic alkali for removing substantial amounts of said hydrogen sulfide from said fluid, whereby an extract is obtained, mixing said extract with aqueous brine anolyte containing bromine in amount sufficient to react and convert substantially all of the hydrogen sulfide in said extract to free sulfur, removing said sulfur thereby leaving a cell feed liquid, and electrolyzing said cell feed liquid under conditions to produce the aforesaid anolyte and catholyte.

References Cited in the file of this patent

UNITED STATES PATENTS

| 1,406,624 | Dow | Feb. 14, 1922 |
| 1,891,974 | Fischer | Dec. 7, 1922 |
| 2,312,365 | Shiffler et al. | Mar. 2, 1943 |
| 2,654,706 | Gaylor | Oct. 6, 1953 |

OTHER REFERENCES

"Analytical Chemistry," vol. 20 (1948), pp. 1008–1014; article by Shaffer et al.